(12) United States Patent
Landry et al.

(10) Patent No.: US 8,285,674 B2
(45) Date of Patent: Oct. 9, 2012

(54) METHOD AND APPARATUS FOR MANAGING SYNCHRONIZATION CONFIGURATION FILES

(75) Inventors: Paul Edward Landry, Waterloo (CA); Michel Schmiderer, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 351 days.

(21) Appl. No.: 12/571,948

(22) Filed: Oct. 1, 2009

(65) Prior Publication Data
US 2010/0100532 A1    Apr. 22, 2010

Related U.S. Application Data

(60) Provisional application No. 61/107,410, filed on Oct. 22, 2008.

(51) Int. Cl.
G06F 17/30    (2006.01)
(52) U.S. Cl. ......... 707/620; 707/663; 709/221; 709/222
(58) Field of Classification Search .......... 707/610–623, 707/661–664; 709/220–222
See application file for complete search history.

(56) References Cited

U.S. PATENT DOCUMENTS

| | | | |
|---|---|---|---|
| 7,882,063 B2 * | 2/2011 | Martin et al. | 707/617 |
| 7,930,215 B2 * | 4/2011 | Pombo et al. | 705/26.1 |
| 7,966,287 B2 * | 6/2011 | Brown | 707/625 |
| 8,180,731 B2 * | 5/2012 | Konno et al. | 707/621 |
| 2002/0120724 A1 * | 8/2002 | Kaiser et al. | 709/221 |
| 2003/0069950 A1 * | 4/2003 | Gieseke | 709/221 |
| 2004/0122873 A1 | 6/2004 | Wright, Jr. et al. | |
| 2005/0027831 A1 * | 2/2005 | Anderson et al. | 709/220 |
| 2007/0106715 A1 * | 5/2007 | Wobbe | 707/205 |
| 2009/0177800 A1 * | 7/2009 | Gidron et al. | 709/248 |

FOREIGN PATENT DOCUMENTS

EP    1942424 A    7/2008

OTHER PUBLICATIONS

Hei Y. et al. "iPod+Itunes passage" IPOD & ITUNES, Dec. 22, 2006; pp. 38-140,XP002476355; ISBN: 978-90-430-1234-8 *pp. 70-73—with English translation of pp. 71-73.
European Patent Application No. EP 09 17 1979 Search Report dated Jan. 20, 2010.
European Patent Application No. 09171979.9 Summons to attend oral proceedings pursuant to Rule 115(1) EPC.
Transferring Files via Bluetooth Between BlackBerry and Mac/CrackBerry.com, downloaded from http://crackberry.com/transferring-files-bluetooth-between-blackberry-and-mac.
Cisco, Device and Subdevice Manager, downloaded from http://www.cisco.com/en/US/docs/net_mgmt/configuration_engine/1.5/administration/guide/devices.html.
Regions/Unenroll for Mobile Banking, downloaded from http://www.regions.com/gsg/unenroll_for_mobile_banking.rf.
Chapter 9. Device Inventory and Configuration, downloaded from http://docs.huihoo.com/zenoss/Zenoss_Administration_2.3.3.pdf.

* cited by examiner

*Primary Examiner* — Fred I Ehichioya
*Assistant Examiner* — Michelle Owyang
(74) *Attorney, Agent, or Firm* — David Johnson; Perry+Currier Inc.

(57) ABSTRACT

A method and apparatus for managing synchronization configuration files at a computing device is provided. It is determined that at least one configuration file has expired, the at least one configuration file associated with a second computing device and comprising data for synchronizing the second computing device with the computing device. A location of the at least one configuration file is then determined. The at least one configuration file is then deleted at the location.

16 Claims, 8 Drawing Sheets

METHOD AND APPARATUS FOR MANAGING SYNCHRONIZATION CONFIGURATION FILES

FIELD

The specification relates generally to synchronization of computing devices, and specifically to a method and apparatus for managing synchronization configuration files.

BACKGROUND

Synchronizing computing devices, for example a desktop computer and a mobile computing device (e.g. a PDA) has become commonplace as people have become used to portability of information. Synchronization generally depends on at least one of the computing devices, for example the desktop computer, storing configuration files which contain data indicative of how to perform the synchronization. For example, the desktop computer may contain a multimedia application that contains playlists of songs/videos/photos/podcasts etc., that can be synchronized with the mobile device, such that the playlists/songs/videos etc. are the same at both computing devices. Presuming the playlists etc., at the desktop computer have been updated between synchronizations, at the next synchronization the updated playlists/songs/videos/photos/podcasts etc. are downloaded to the mobile device. The configuration files can instruct a synchronization application of which playlists to update during synchronization.

However, a mobile device, by its nature, may only be in use for a short time relative to a desktop computer. Old configuration files associated with mobile devices no longer in use, and stored at the desktop computer, waste system resources by both cluttering the memory of the desktop computer, and causing the desktop computer to waste processing time by sorting through all the configuration files in the memory to find the one(s) it needs to effect a synchronization for a mobile device currently in use.

SUMMARY

A first aspect of the specification provides a method for managing synchronization configuration files at a computing device. The method comprises determining that at least one configuration file has expired, the at least one configuration file associated with a second computing device and comprising data for synchronizing the second computing device with the computing device. The method further comprises determining a location of the at least one configuration file. The method further comprises causing the at least one configuration file to be deleted at the location. The method can further comprise: detecting that the second computing device is in communication with the computing device after the at least one configuration file has been deleted; and, in response: determining that the second computing device is a new computing device to be synchronized with the computing device; compiling at least one new configuration file comprising new data for synchronizing the second computing device with the computing device; and storing the at least one new configuration file in association with the second computing device.

The at least one configuration file can be associated with the second computing device via an identifier of the second computing device.

Determining that at least one configuration file has expired can comprise determining that a time between a last synchronization and a present time has exceeded a threshold value.

Determining that at least one configuration file has expired can comprise receiving an indication that synchronization between the computing device and the second computing device is no longer required.

The at least one configuration file can be stored in a memory of the computing device, in association with an identifier of the second computing device, and determining a location of the at least one configuration file can comprise: determining the identifier; and finding the location using the identifier. Determining the identifier can comprise looking up the identifier in a list of other computing devices which have previously been synchronized with the computing device.

The data for synchronizing the second computing device with the computing device can comprise data indicative of at least one file to be downloaded from the computing device to the second computing device when the second computing device is in communication with the computing device.

The at least one file can comprise a multimedia file. The at least one file can be stored in association with a multimedia application at the computing device.

A second aspect of the specification provides a computing device for managing synchronization configuration files. The computing device comprises an interface for communicating with a second computing device. The computing device further comprises a memory for storing at least one configuration file associated with the second computing device, the at least one configuration file comprising data for synchronizing the second computing device with the computing device. The computing device further comprises a processor in communication with the interface and the memory. The processor is enabled to: determine that the at least one configuration file has expired; determine a location of the at least one configuration file; and cause the at least one configuration file to be deleted at the location.

The processor can be further enabled to: detect that the second computing device is in communication with the computing device after the at least one configuration file has been deleted; and, in response: determine that the second computing device is a new computing device to be synchronized with the computing device; compile at least one new configuration file comprising new data for synchronizing the second computing device with the computing device; and store the at least one new configuration file in association with the second computing device in the memory. The at least one configuration file can be associated with the second computing device via an identifier of the second computing device.

To determine that the at least one configuration file has expired, the processor can be further enabled to determine that a time between a last synchronization and a present time has exceeded a threshold value.

The computing device can further comprise an input device. To determine that the at least one configuration file has expired, the processor can be further enabled to receive an indication from the input device that synchronization between the computing device and the second computing device is no longer required.

The at least one configuration file can be stored in the memory in association with an identifier of the second computing device, and to determine a location of the at least one configuration file the processor can be further enabled to determine the identifier and find the location in the memory using the identifier. Determining the identifier can comprise looking up the identifier in a list of computing devices which have previously been synchronized with the computing device.

The data for synchronizing the second computing device with the computing device can comprise data indicative of at least one file to be downloaded from the computing device to the second computing device when the second computing device is in communication with the computing device.

The at least one file can comprises a media file. The at least one file can be stored in association with a multimedia application at the computing device.

BRIEF DESCRIPTIONS OF THE DRAWINGS

Embodiments are described with reference to the following figures, in which.

DETAILED DESCRIPTION OF THE EMBODIMENTS

Figure 1:
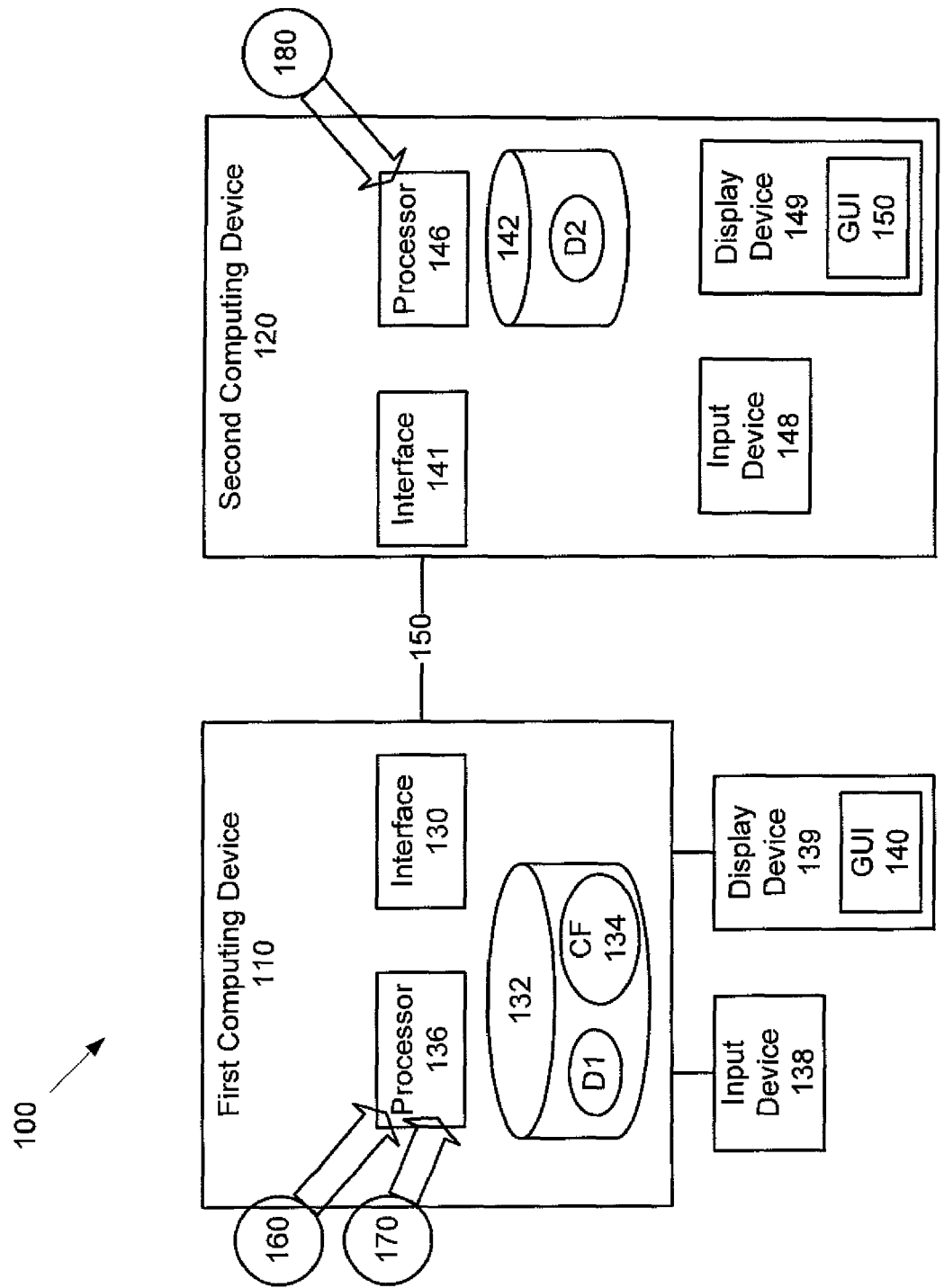
FIG. 1 depicts a system for updating synchronization between a first computing device and a second computing device, according to non-limiting embodiments.

FIG. 1 depicts a system 100 for updating synchronization between a first computing device 110 and a second computing device 120, according to non-limiting embodiments, synchronization occurring when the second computing device 120 is in communication with the first computing device 110. The computing devices 110, 120 synchronize via a link 150. The link 150 can be wired or wireless as desired; the link 150 can further comprise any suitable communication network. Synchronization can occur between the computing devices 110, 120 periodically and/or when communications are initialized and/or when triggered by a user of the first and/or second computing devices 110, 120. In general, during synchronization, specific data present at each of the computing devices 110, 120 is resolved such that similar versions of the data are present on both of the computing devices 110, 120. Such synchronization can comprise at least one of: downloading data to the second computing device 120 from the first computing device 110; uploading data to the first computing device 110 from the second computing device 120; and deleting data from at least one of the first and second computing devices 110, 120.

The first computing device 110 generally comprises any suitable computing device, including but not limited to a desktop computer, a laptop computer, a server, a multimedia player, and the like.

The first computing device 110 comprises an interface 130 enabled to communicate with the second computing device 120, the interface 130 being generally compatible with the link 150. That is, if the link 150 comprises a wireless link, the interface 130 is enabled to communicate wirelessly, using any suitable protocol; and/or if the link 150 comprises a wired link, then the interface 130 is enabled to communicate via a wired link, using any suitable wired protocol.

The first computing device 110 further comprises a memory 132 for storing at least one configuration file 134 associated with the second computing device 120, the at least one configuration file 134 comprising data for synchronizing the second computing device 120 with the first computing device 110, and described in more detail below. The memory 132 can further comprise data D1, which is to be synchronized with data D2 stored at the second computing device 120. In some embodiments, the data D1 and D2 can comprise any suitable media file, including but not limited to music data, video data, podcast data, image data, playlists, and library(ies) of media files.

In some embodiments, a plurality of configuration files are associated with the second computing device 120, the plurality of configuration files including the at least one configuration file 134, and stored in the memory 132.

The memory 132 can comprise any suitable memory device, including but not limited to random access memory (RAM), removable memory, memory cards, hard disks, and the like. In some embodiments, the memory 132 can comprise a database, with the at least one configuration file 134 stored therein.

The first computing device 110 further comprises a processor 136 in communication with the interface 130 and the memory 132, for example via a suitable computer bus (not depicted). The processor 136 is generally enabled to effect synchronization between the two computing devices 110, 120, including but not limited to downloading at least a subset of data D1 to the second computing device 120, receiving at least a subset of data D2 from the second computing device 120 and storing the at least a subset of data D2 in storage, and deleting at least a subset of data D1. The processor 136 is also enabled to: determine that the at least one configuration file 134 has expired; determine a location of the at least one configuration file 134; and cause the at least one configuration file 134 to be deleted at the location.

The first computing device 110 can also be in communication with any suitable input device 138, or combination of input devices, including but not limited to a keyboard, a pointing device, a mouse, a trackball, a touchscreen, a touchpad, and the like. The first computing device 110 is generally enabled to receive input data from the input device 138 for processing by the processor 136.

The first computing device 110 can also be in communication with any suitable display device 139, the processor 136 further enabled to control the display device 139 to display information, for example regarding synchronization, including but not limited to at least one graphical user interface (GUI) 140. The display device 139 can include but is not limited to a flat panel display (e.g. a liquid crystal display (LCD), plasma, and the like), a cathode ray tube (CRT), a computer monitor, and the like.

The input device 138 and the display device 139 can be used by a user to interact with the first computing device 110.

In some embodiments, the first computing device 110 can comprise the input device 138 and the display device 139.

The first computing device 110 further comprises a synchronization application 160. The synchronization application 160 causes the processor 136 to perform several functions when the processor 136 processes the synchronization application 160. For example, the synchronization can cause the processor 136 to synchronize the computing devices 110, 120 when the computing devices 110,120 are in communication. In particular, the synchronization application 160 causes data D1 and D2 to synchronize in accordance with the at least one configuration file 134 associated with the second computing device 120. For example, the at least one configuration file 134 can comprise data indicative of a subset of data D1 that is to be synchronized with data D2.

The synchronization application 160 can be stored in the memory 132 and processed by the processor 136, which then controls the display device to display the at least one GUI 140, such that a user can interact with the synchronization application 160 via the input device 138.

The first computing device 110 can further comprise a data management application 170 for managing data D1. In some embodiments, the data management application 170 can comprise a multimedia file management application for managing and/or playing multimedia files and/or downloading multimedia files from a communication network (not depicted), for example via the Internet. In these embodiments, the data D1 comprises media data as described above. Furthermore, in embodiments where the data management application 170 is for downloading multimedia files from a communication network, the interface 130 is enabled to communicate via the communication network. The data management application 170 can be stored at the memory 132 and processed by the processor 136, for example, when input data indicative of a desire to use the data management application 170 is received via the input device 138.

The second computing device 120 generally comprises a portable computing device, including but not limited to a PDA (personal digital assistant), a cell phone, a laptop computer and the like, and/or a combination. In general, the second computing device 120 comprises any device which can be synchronized with the first computing device 110.

The second computing device 120 comprises an interface 141, similar to interface 130, and generally compatible with link 150. The second computing device 120 further comprises a memory 142 for storing the data D2. The memory 142 can be similar to the memory 132, as described above. The second computing device 120 further comprises a processor 146 for effecting synchronization between the first and second computing devices 110, 120, including but not limited to uploading at least a subset of data D2 to the first computing device 110, receiving at least a subset of data D1 from the first computing device 110 and storing the at least a subset of data D1 in storage, and deleting at least a subset of data D2.

The second computing device 120 further comprises an input device 148, similar to the input device 138 and a display device 149 similar to the display device 139. The display device 149 is generally enabled to display a GUI 150 such that a user can interact with the second computing device 120 via the input device 148 and the display device 149.

In some embodiments, the second computing device 120 further comprises a synchronization application 180 for managing synchronization at the second computing device 120 when synchronization is occurring. The synchronization application 180 can be stored at the memory 142 and processed by the processor 146 when synchronization is initiated, for example once the link 150 is established. In some embodiments, the synchronization application 180 can also cause synchronization to initiate when processed by the processor 146.

Figure 2:
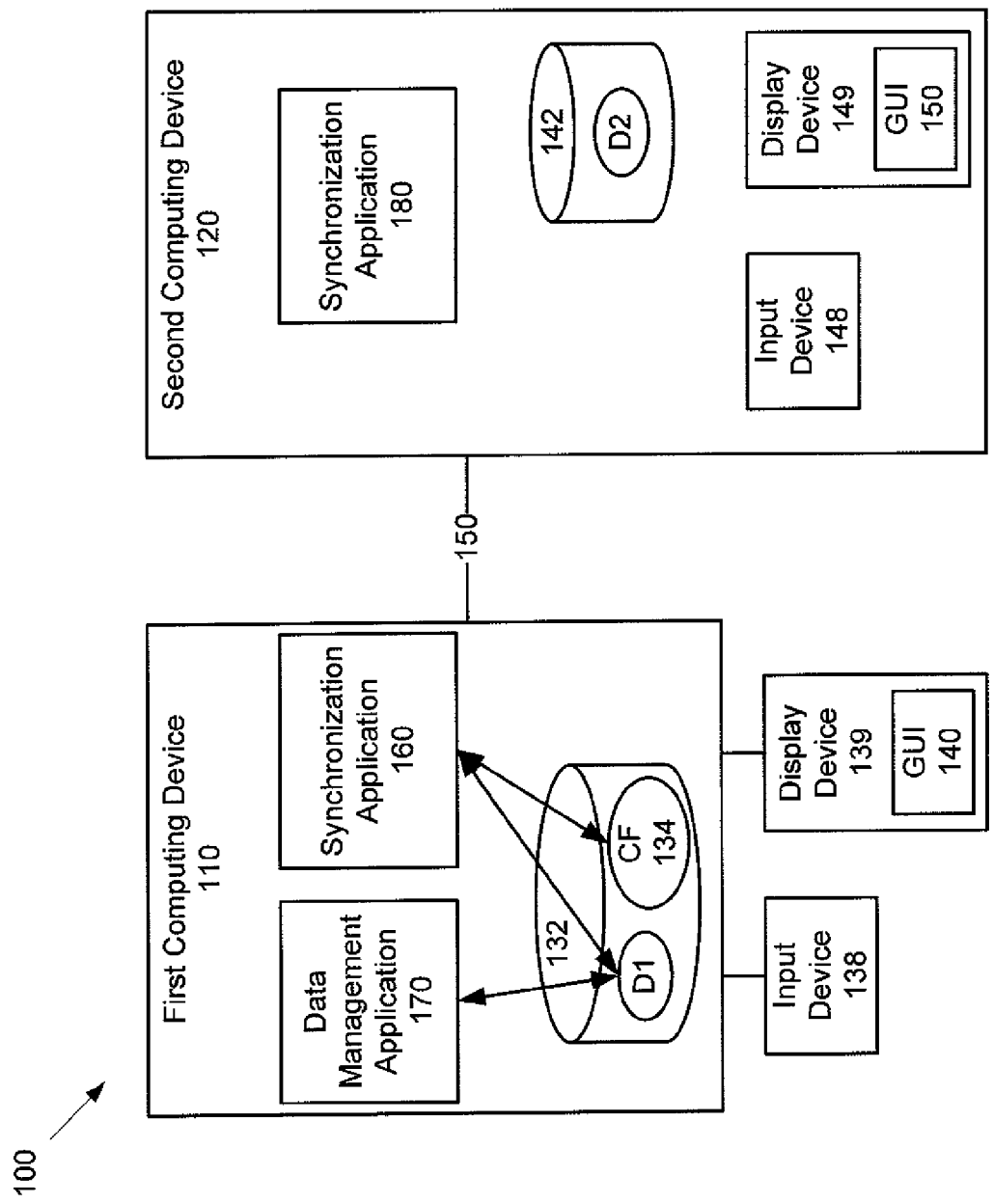
FIG. 2 depicts a block diagram of applications being processed by the system of FIG. 1, according to non-limiting embodiments.

Attention is now directed to FIG. 2 which depicts a block diagram of applications 160, 170 and 180, according to non-limiting embodiments. While not all elements of each of the computing devices 110, 120 are depicted in FIG. 2, it is understood that the applications 160 and 170 are being processed by the processor 136, and that the application 180 is being processed by the processor 146. It is further understood that communications between the computing devices 110, 120 are proceeding via the interfaces 130, 141.

It is generally understood that the data management application 170 manages data D1 by adding to the data D1, deleting at least a subset of the data D1, or updating the data D1, for example in accordance with input received via the input device 138. In the following discussion, synchronization will be described with reference to the data D1 comprising multimedia data files which are managed via the data management application 170 and stored in the memory 132. It is further understood that the data D2 comprises multimedia data files that are to be synchronized with at least a subset of the data D1. In particular, it is assumed that the data D1 comprises songs/media files, and playlists each of which comprises a list of songs/media files that are to be played when a playlist is processed. It is understood, however, that such playlists can comprise any suitable combination of music data, video data, podcast data, image data, and the like, and that in the following description the reference to "songs" is merely exemplary and not to be considered limiting. In any event, in these embodiments, a subset of the data D1 can comprise the playlist presented in Table 1, according to non-limiting embodiments:

| Playlist Title: Party Shuffle |
|---|
| Song 1 |
| Song 2 |
| Song 3 |
| Song 4 |

While the subset of data D1 in Table 1 is presented in the format of rows and columns, it is understood that any suitable format can be used. In embodiments of the subset of data D1 presented in Table 1, the subset of data D1 comprises a title of the play list ("Party Shuffle"), and a list of the names of songs/media files (Song 1, Song 2, . . . etc.), stored in an order that they are to be played when the playlist is processed, for example via the data management application 170. Furthermore, it is understood that the data D1 further comprises the songs/media files Song 1, Song 2 . . . , and that the multimedia files Song 1, Song 2, . . . are retrievable from the memory 132 and playable by the data management application 170.

It is further understood that the data D1 can be updated: for example, songs in the "Party Shuffle" playlist can be added and/or deleted and/or the order of their play can be changed, via interactions with the input device 138 and the data management application 170.

It is yet further understood that the data D1 can comprise more than one playlist.

It is further understood that the synchronization application 170 can update the at least one configuration file 134 by adding to the at least one configuration file, and/or deleting at least a subset of the at least one configuration file 134, or updating the at least one configuration file 134, for example in accordance with input received via the input device 138. Furthermore, it is understood that such updating can occur in the absence of communication between the computing devices 110, 120.

The at least one configuration file 134 comprises data for synchronizing the second computing device 120 with the first computing device 110. In particular, the at least one configuration file 134 can comprise identifiers of subsets of the data D1 which are to be synchronized with the data D2 stored at the second computing device 120. For example the at least one configuration file 134 can comprise a list of files stored in data D1 that are to be synchronized with data D2. Continuing with the example of the data D1 and the data D2 comprising playlist, songs/media files, Table 2 presents a non-limiting exemplary embodiment of the at least one configuration file 134:

TABLE 2

An embodiment of the at least one configuration file 134.
"Second Computing Device ID"

Party Shuffle
Genius
90's Music

While the at least one configuration file 134 in Table 2 is presented in the format of rows and columns, it is understood that any suitable format can be used. In embodiments of the at least one configuration file 134 presented in Table 2, the at least one configuration file 134 comprises any suitable identifier of the second computing device 120 ("Second Computing Device ID"), for example a MAC Address, a name of the second computing device 120, a phone number associated with the second computing device 120, a personal identification number (PIN) associated with the second computing device 120, and the like. The at least one configuration file 134 further comprises a list of playlists ("Party Shuffle", "Genius", and "90's Music") stored in the data D1 which are to be stored and/or synchronized in the data D2. It is further understood that the synchronization application 160 can process each of the playlists and determine which songs on each of the playlists are to be downloaded to the second computing device 120.

It is furthermore understood that the at least one configuration file 134 can be updated via the GUI 140 and the synchronization application 160.

Figure 3:
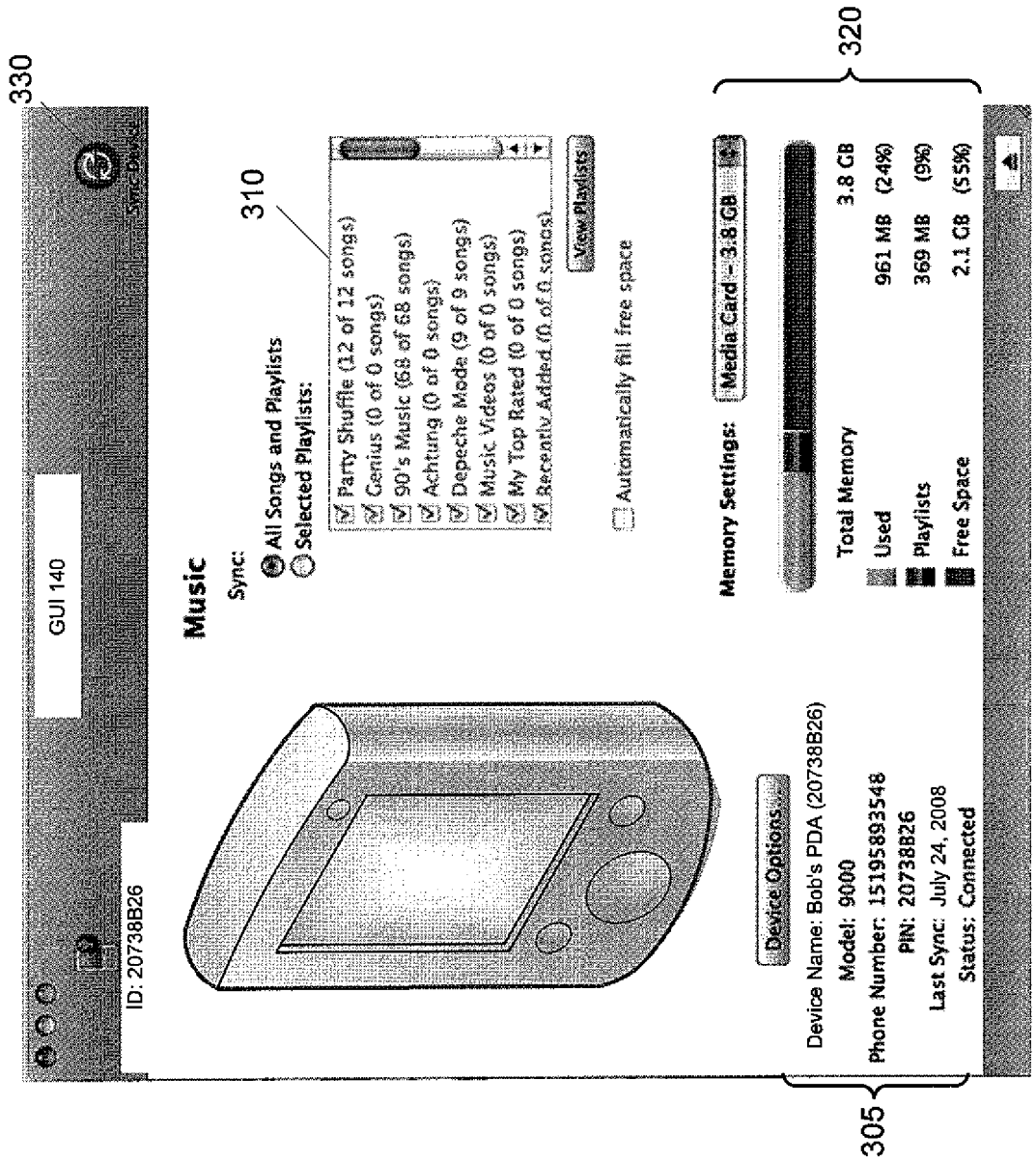
FIG. 3 depicts a GUI for updating synchronization between a first computing device and a second computing device, according to non-limiting embodiments.

For example, attention is directed to FIG. 3 which depicts the GUI 140 when display device 139 is being controlled to display data associated with the synchronization application 160. Identifiers associated with the second computing device 120 ("ID", "Model", "Phone Number", "PIN") are displayed in fields 305. In some embodiments, an identifier can be entered into one of the fields 305 to identify the second computing device 120 in the absence of communication between the computing devices 110, 120.

In addition, several synchronization options are presented within the GUI 140 presented in FIG. 3: "All Songs and Playlists" and "Selected Playlists". If "All Songs and Playlists" is selected then all of data D1 is synchronized with data D2 during a synchronization. Otherwise if "Selected Playlists" is selected, then only the playlists which are selected in the associated list 310 are synchronized. In general, the various selections are stored in the at least one configuration file 134.

It is further understood that the synchronization application 160 can retrieve the playlist data that populates the list 310 from the data D1. For example, the synchronization application 160 can be enabled to cause the processor 136 to process the at least one configuration file 134 and determine the subset of the data D1 which comprises identifiers/names of playlists and to further save identifiers/names of playlists in the at least one configuration file 134.

In general, synchronization does not proceed until communication has been established between the computing devices 110, 120 (e.g. via link 150) and a button 330 ("Synch Device") is actuated in GUI 140.

The GUI 140 presented in FIG. 3 further comprises memory data 320 which provides a breakdown of the configuration of the memory 142. In general the memory data 320 can be retrieved from the second computing device 120 when communications between the computing devices 110, 120 are initiated and/or when the synchronization application 160 is initiated. Furthermore, in some embodiments, the memory data 320 can be stored in the at least one configuration file 134, and retrieved for display in the GUI in the absence of communications between the computing devices 110, 120.

Figure 6:
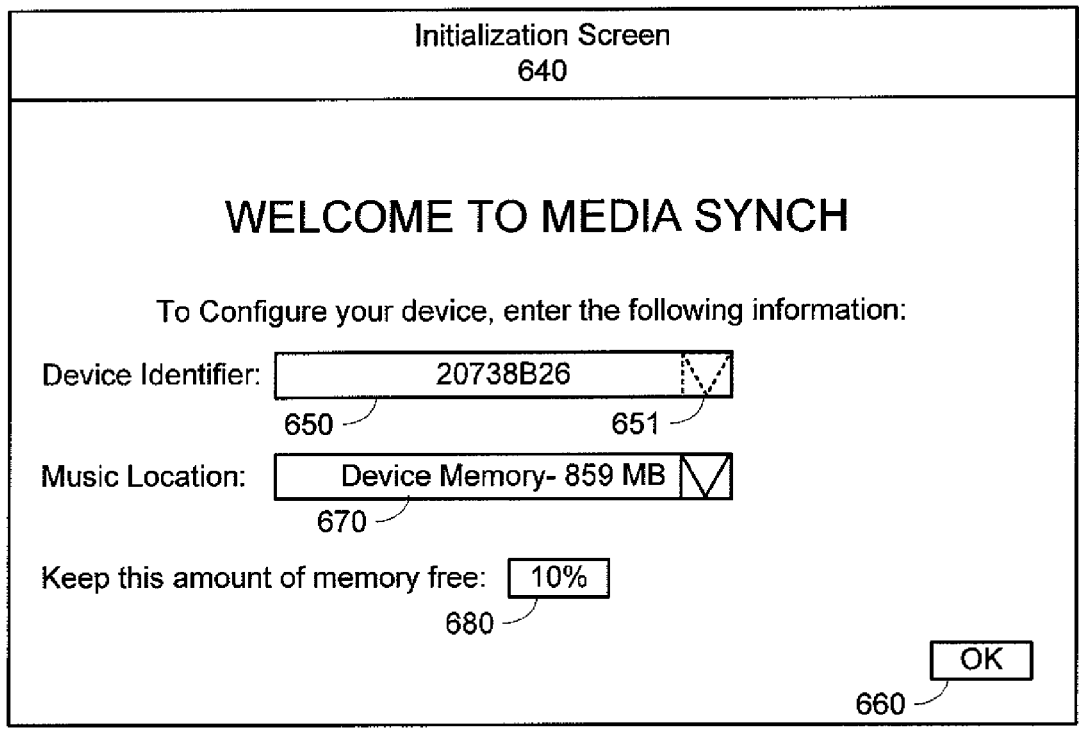

In some non-limiting embodiments, upon initialization of the synchronization application 160, and prior to display of the GUI 140, the display device 139 can be controlled to display an initialization screen 640, as depicted in FIG. 6, according to non-limiting embodiments. In these embodiments, the second communication device 120 can be identified via the initialization screen 640, in the absence of communications between the computing devices 110, 120.

The initialization screen 640 comprises a GUI, and displays information related to setting up the synchronization. For example, box 650 comprises an area of the initialization screen where an identifier of the second computing device 120 can be entered, thus identifying the second communication device 120.

In some embodiments, box 650 can comprise a pulldown menu (e.g. accessible via optional button 651), within which is provided a list of other computing devices which have previously been synchronized with the first computing device 110, including but not limited to the second computing device 120. The identifier of the second computing device 120 can be chosen from such a list.

Alternatively, in some embodiments the device identifier can be retrieved from the second communication device 120 when communications are established between the computing devices 110, 120, and the device identifier can be automatically displayed in box 650.

Figure 5:
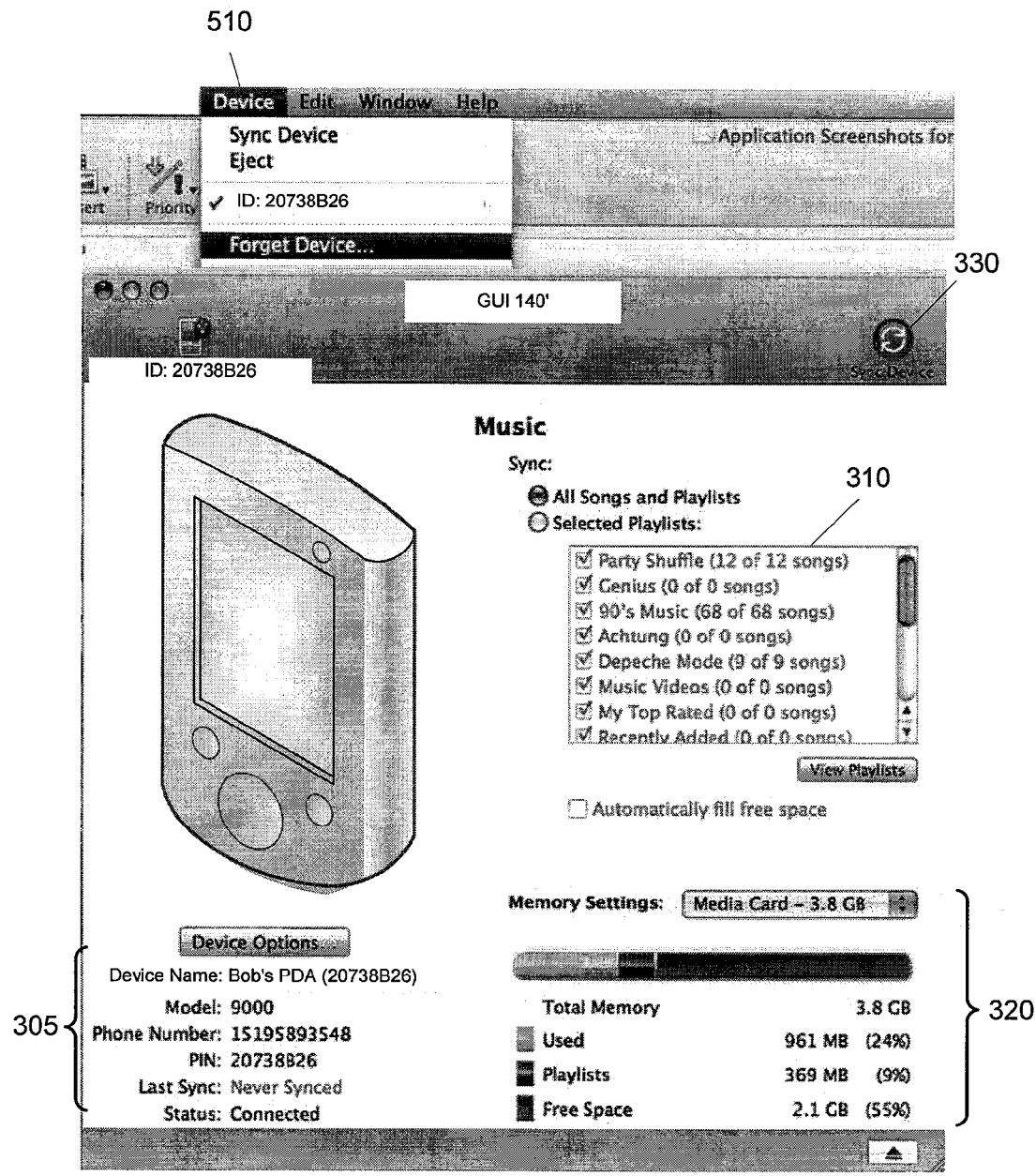
FIGS. 5 and 6 depict GUIs for updating synchronization between a first computing device and a second computing device, according to non-limiting embodiments.

Once the device identifier is entered and/or chosen, an "OK" button 660 can be actuated via input device 138 which results in the display of the GUI 140 (and/or the GUI 140" described below with reference to FIG. 5).

In some embodiments, other preferences can be specified in the initialization screen 640. For example, in some embodiments, a location for storing music/data D2 in the second computing device 120 can entered in a box 670. For example, if the second computing device 120 comprises more than one memory, in addition to memory 142, (e.g. a memory/media card) the memory where music/data F2 is to be stored is specified in box 670. In yet further embodiments, an amount of the memory specified in box 670 to keep free can be entered in a box 680: for example, within embodiments depicted in FIG. 6, "10%" of the "DEVICE MEMORY" is to be kept free. The preferences entered into box 670 and box 680 can also be stored in the at least one configuration file 134.

Now, in instances where a user of the computing devices 110, 120 discards, loses and/or replaces the second computing device 120, the at least one configuration file 134 is maintained in the memory 132. Should the user replace the second computing device 120 with a new computing device, a new configuration file(s) (not depicted) associated with the new computing device is/are stored in the memory 132. The at least one configuration file 134 is then wasting resources at the first computing device 110, including those portions of the memory 132 where the at least one configuration file 134 is stored, and further processing time at the processor 136, as the processor 136 needs to sort through extraneous data at the memory 132 to find the new configuration file(s) and/or data D1.

Alternatively, in some embodiments, it can be desired to reset the synchronization configuration of the second computing device 120. For example, if there are a large number of playlists, it can become unwieldy for a user to select and/or deselect playlists from the list 310, if current preferences of the user are significantly different from the saved preferences (i.e. selections). It can hence be preferable to "start from scratch" and forget the preferences stored in the at least one configuration file 134.

Figure 4:
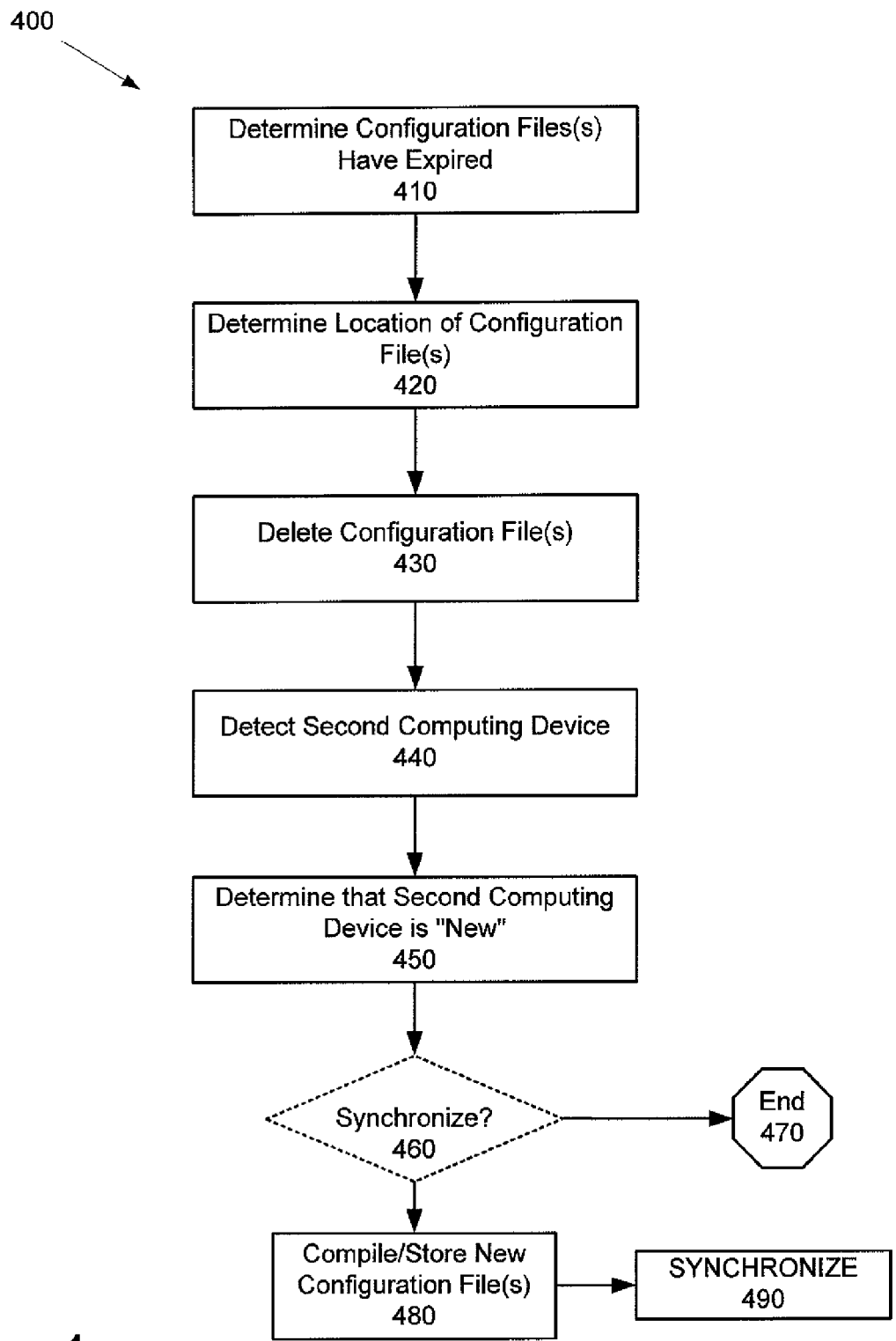
FIG. 4 depicts a method for updating synchronization between a first computing device and a second computing device, according to non-limiting embodiments.

Attention is now directed to FIG. 4 which depicts a method 400 for managing synchronization configuration files, for example the at least one configuration file 134. In order to assist in the explanation of the method 400, it will be assumed that the method 400 is performed using the system 100. Furthermore, the following discussion of the method 400 will lead to a further understanding of the system 100 and its various components. However, it is to be understood that the system 100 and/or the method 400 can be varied, and need not work exactly as discussed herein in conjunction with each other, and that such variations are within the scope of present embodiments.

It is further understood that method 400 is not limited to embodiments where the second computing device 120 is in communication with the first computing device 110. Indeed, method 400 can be implemented in embodiments where the second computing device 120 has been lost or replaced and/or is no longer present in system 100.

At step 410 it is determined if the at least one configuration file 134 has expired. For example, in some embodiments, if a time between a last synchronization of the computing devices 110, 120, and a present time has exceeded a threshold value, then it can be assumed that synchronization of the second computing device 120 with the first computing device 110 is no longer required. For example, the second computing device 120 may have been lost or replaced, as described above. Hence, the at least one configuration file 134 is determined to have expired and is no longer required.

Alternatively, it is determined that the at least one configuration file 134 has expired if an indication is received that synchronization between the computing devices 110, 120 is no longer required. In some embodiments, the indication can be received via an interaction with the input device 138 and the display device 139. For example, attention is directed to FIG. 5, which depicts non-limiting embodiments of a GUI 140', similar to the GUI 140 depicted in FIG. 3, with like elements having like numbers. However, GUI 140' includes a pulldown menu 510 which includes a "Forget Device" option. If the "Forget Device" option is chosen, for example by using the input device 138, then it is determined that the at least one configuration file 134 has expired. In some of these embodiments, the user can be prompted to subsequently confirm the "Forget Device" option. In some embodiments, the pulldown menu 510 can be provided in the same window as the list 310 etc., while in other embodiments, the pulldown menu 510 can be located in a different window.

At step 420, the location of the at least one configuration file 134 is determined, for example at a memory location in the memory 132 and/or a location in a table/list/library in data D1. If there is more than one configuration file stored in the memory 132, for example other configuration files associated with other computing devices that have previously been synchronized with the first computing device 110, then the at least one configuration file 134 can be identified via an identifier of the second computing device 120 stored in the at least one configuration file 134, as described above.

In embodiments which comprise a plurality of configuration files associated with the second computing device 120, the plurality of configuration files including the at least one configuration file 134, the location of each of the plurality of configuration files is determined.

In some embodiments, the identifier can be determined by looking up the identifier in a list of other computing devices which have previously been synchronized with the first computing device 110, including but not limited to the second computing device 120. In yet further embodiments, a pulldown menu, similar to pulldown menu 510, can be provided which provides such a list. The identifier of the second computing device 120 can be chosen from this list via the input device 128. In some embodiments, the identifier is determined prior to step 410, for example via initialization screen 640, described above.

Figure 7:
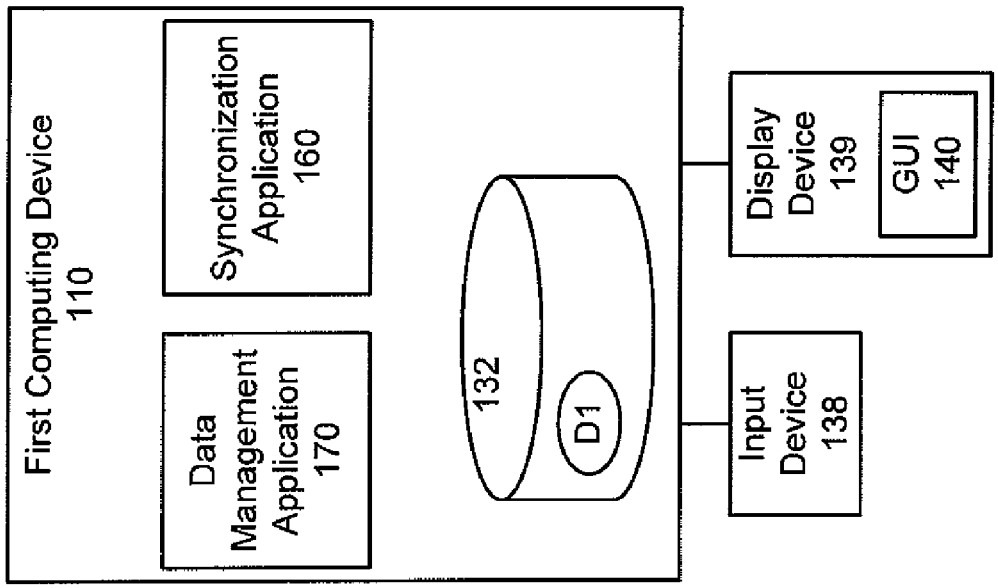
FIG. 7 depicts the first computing device of FIG. 1 after at least one configuration file has been deleted, according to non-limiting embodiments.

At step 430 the at least one configuration file 134 (and/or the plurality of configuration files) is deleted at the location(s) in the memory 132. Hence, the at least one configuration file 134 is no longer wasting resources at the first computing device 110, as the at least one configuration file 134 and/or the plurality of configuration files, is no longer present on the first computing device 110. This leaves the first computing device 110 in the state depicted in FIG. 7, according to non-limiting embodiments, wherein no configuration files associated with the second computing device 120 are stored in the memory 132. It is understood, however, that other configuration files associated with other computing devices can be stored in the memory 132.

Furthermore, in some embodiments, the second computing device 120 can again be synchronized with the first computing device 110, and the first computing device 110 now processes the synchronization as if the second computing device 120 is a new computing device that has not been previously synchronized with the first computing device 110 via optional steps 440-470.

For example, at step 440, it is detected that the second computing device 120 is in communication with the first computing device 110 after the at least one configuration file 134 has been deleted. For example, attention is directed to FIG. 8, which is substantially similar to FIG. 2, with like elements having like numbers. In some of these embodiments, a user can again cause communication between the computing devices 110, 120 to be established after the at least one configuration file 134 has been deleted, with an intent of initiating synchronization. Alternatively, such a communication can be initiated based on pre-configured settings in at least one of the computing devices 110, 120 (e.g. a synchronization is periodically and automatically initiated, the first step of which is initiating communications between the computing devices 110, 120). In other embodiments, steps 410-430 can occur while the computing devices 110, 120 are in communication, such that the at least one configuration file 134 is deleted in order to reset the configuration of the second computing device 120. In any event, the first computing device 110 detects the second computing device 120 at step 440.

At step 450, it is determined that the second computing device 120 is a new computing device to be synchronized with the first computing device 110. For example, the processor 136 (via processing the synchronization application 160), checks the memory 132 for configuration files associated with the second computing device 120. As none are found (i.e. the at least one configuration file 134 was previously deleted), the processor 136 effectively determines that the second computing device 120 has not previously been synchronized with the first computing device 110. Hence the GUI 140 is generated in accordance with this determination: e.g. checkboxes in list 310 are given default values (e.g. all checked or all unchecked). Preferences for synchronizing can then be specified via the GUI 140, as described above, as if no preferences had been previously specified.

In some embodiments, the GUI 140 can be displayed at step 440 or step 450, such that the device identifier can be entered; alternatively, the device identifier is retrieved from the second computing device 120 when communications are established and automatically displayed in box 650.

In an optional step 460, it is determined if the synchronization is to proceed. For example, in some embodiments, synchronization proceeds when the button 330 is actuated. Alternatively, a window comprising the GUI 140 can be closed via the input device 138, and the method ends at step 470.

Figure 8:
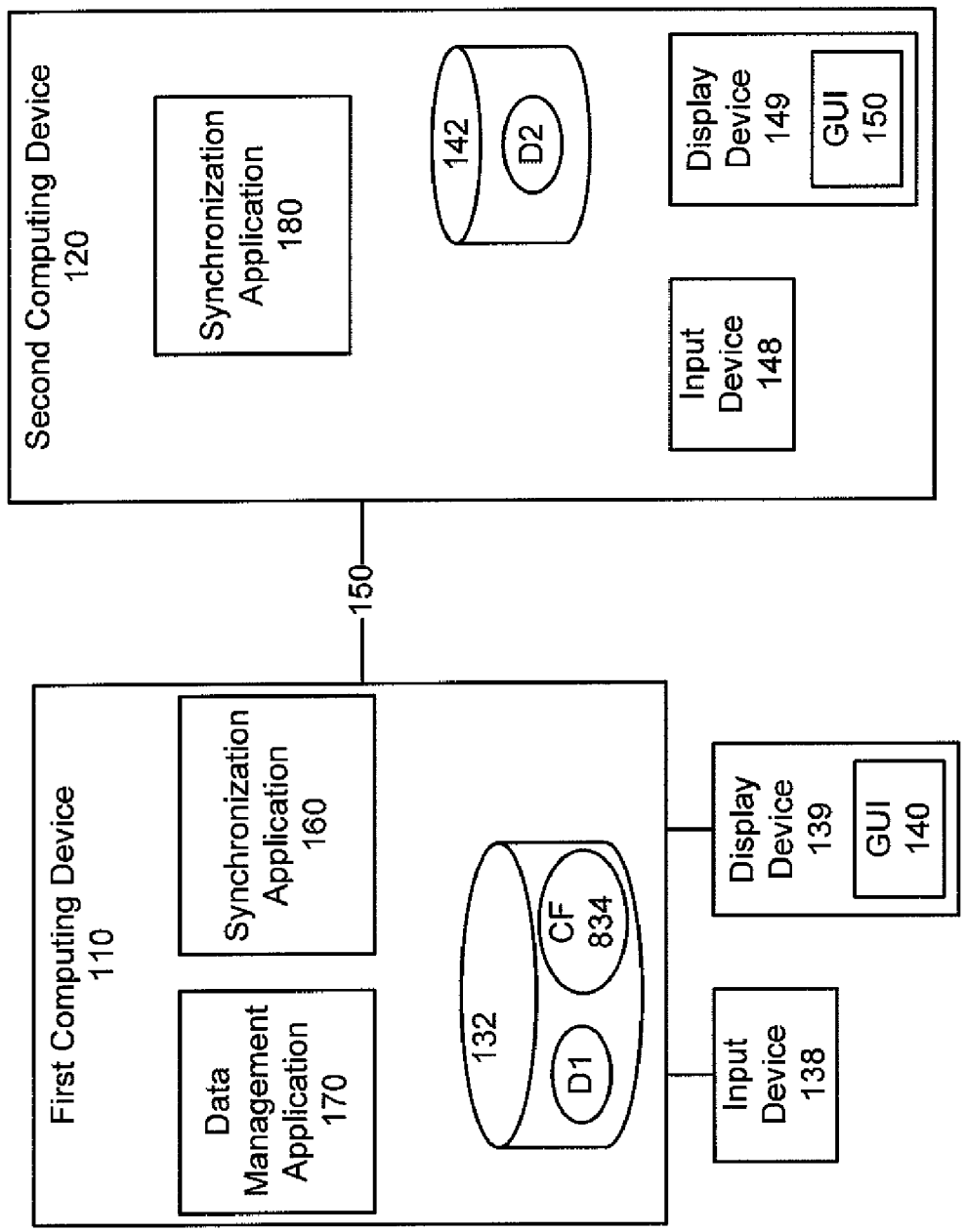
FIG. 8 depicts the system of FIG. 1 after at least one new configuration file has been compiled and stored, according to non-limiting embodiments.

However, if synchronization is to proceed (e.g. button 330 is actuated), at step 480, at least one new configuration file 834, (e.g. as depicted in FIG. 8) is compiled by the processor 136 based on the specified preferences, the at least one new configuration file 834 comprising new data for synchronizing the second computing device 120 with the first computing device 110. The new at least one new configuration file 834 is subsequently stored in the memory 132, in association with the second computing device 120: for example, the at least one new configuration file 834 can comprise an identifier of the second computing device 120, as described above. Synchronization then occurs at step 490.

In some embodiments, however, the at least one new configuration file 834 is created at step 450, or immediately following step 450, prior to any optional synchronization, such that the preferences are saved even in the absence of a synchronization.

Hence, the second communication computing device 120 is first forgotten by the first computing device 110, via the deletion of the at least one configuration file 134, such that the preferences for synchronization can be set back to default values via the creation of the at least one new configuration file 834.

Thus, via steps 410-430, configuration files associated with mobile devices no longer in use, and stored at the computing device 110 (such as at least one configuration file 134) are deleted from the computing device 110. This can relieve potential strain on the system resources of the computing device 110. For example, by deleting the at least one configuration file 134, more space can be made available within the memory 132 for configuration files associated with mobile devices that are in use. Furthermore, the processor 136 can be relieved of sorting through unused configuration files, such that configuration files associated with mobile devices that are in use can be found more easily to effect a synchronization for such mobile devices. In addition, steps 410-430 can provide a convenient method of resetting preferences for a synchronization of a mobile device by deleting the at least one configuration file 134, and then creating the at least one new configuration file 834 which comprises default values/preferences. The computing device 110 can again be relieved of potential strain on system resources as the processor 136 no longer needs to process additional input data for resetting preferences from the input device 138. The input device 138 can be further relieved from mechanical stress as it no longer needs to receive such input data from a user.

Those skilled in the art will appreciate that in some embodiments, the functionality of the first computing device 110 and the second computing device 120 can be implemented using pre-programmed hardware or firmware elements (e.g., application specific integrated circuits (ASICs), electrically erasable programmable read-only memories (EEPROMs), etc.), or other related components. In other embodiments, the functionality of the first computing device 110 and the second computing device 120 can be achieved using a computing apparatus that has access to a code memory (not shown) which stores computer-readable program code for operation of the computing apparatus. The computer-readable program code could be stored on a computer readable storage medium which is fixed, tangible and readable directly by these components, (e.g., removable diskette, CD-ROM, ROM, fixed disk, USB drive). Alternatively, the computer-readable program code could be stored remotely but transmittable to these components via a modem or other interface device connected to a network (including, without limitation, the Internet) over a transmission medium. The transmission medium can be either a non-wireless medium (e.g., optical and/or digital and/or analog communications lines) or a wireless medium (e.g., microwave, infrared, free-space optical or other transmission schemes) or a combination thereof.

A portion of the disclosure of this patent document contains material which is subject to copyright protection. The copyright owner has no objection to the facsimile reproduction by any one of the patent document or patent disclosure, as it appears in the Patent and Trademark Office patent file or records, but otherwise reserves all copyrights whatsoever.

Persons skilled in the art will appreciate that there are yet more alternative implementations and modifications possible for implementing the embodiments, and that the above implementations and examples are only illustrations of one or more embodiments. The scope, therefore, is only to be limited by the claims appended hereto.

What is claimed is:

1. A method for managing synchronization configuration files at a computing device, the method comprising:
   determining that at least one configuration file has expired by determining that a time between a last synchronization and a present time has exceeded a threshold value, said at least one configuration file associated with a second computing device and comprising data for synchronizing said second computing device with said computing device; and, when it is determined that said at least one configuration file has expired:
      determining a location of said at least one configuration file; and
      causing said at least one configuration file to be deleted at said location;
   detecting that said second computing device is in communication with said computing device after said at least one configuration file has been deleted; and, in response:
      determining that said second computing device is a new computing device to be synchronized with said computing device;
      receiving at least a subset of data from the second computing device and storing the at least a subset of data;
      compiling at least one new configuration file comprising new data for synchronizing said second computing device with said computing device; and
      storing said at least one new configuration file in association with said second computing device.

2. The method of claim 1, wherein said at least one configuration file is associated with said second computing device via an identifier of said second computing device.

3. The method of claim 1, wherein determining that at least one configuration file has expired further comprises receiving an indication that synchronization between said computing device and said second computing device is no longer required.

4. The method of claim 1, wherein said at least one configuration file is stored in a memory of said computing device, in association with an identifier of said second computing device, and said determining a location of said at least one configuration file comprises determining said identifier and finding said location using said identifier.

5. The method of claim 4, wherein said determining said identifier comprises looking up said identifier in a list of other computing devices which have previously been synchronized with said computing device.

6. The method of claim 1, wherein said data for synchronizing said second computing device with said computing device comprises data indicative of at least one file to be downloaded from said computing device to said second computing device when said second computing device is in communication with said computing device.

7. The method of claim 6, wherein said at least one file comprises a multimedia file.

8. The method of claim 1, wherein said at least one configuration file is stored in association with a multimedia application at said computing device.

9. A computing device for managing synchronization configuration files, said computing device comprising:
  an interface for communicating with a second computing device;
  a memory for storing at least one configuration file associated with said second computing device, said at least one configuration file comprising data for synchronizing said second computing device with said computing device; and
  a processor in communication with said interface and said memory, said processor enabled to:
    determine that said at least one configuration file has expired by determining that a time between a last synchronization and a present time has exceeded a threshold value; and, when it is determined that said at least one configuration file has expired:
    determine a location of said at least one configuration file; and
    cause said at least one configuration file to be deleted at said location;
  said processor further enabled to:
    detect that said second computing device is in communication with said computing device after said at least one configuration file has been deleted; and, in response:
      determine that said second computing device is a new computing device to be synchronized with said computing device;
      receive at least a subset of data from the second computing device and store the at least a subset of data;
      compile at least one new configuration file comprising new data for synchronizing said second computing device with said computing device; and
      store said at least one new configuration file in association with said second computing device in said memory.

10. The computing device of claim 9, wherein said at least one configuration file is associated with said second computing device via an identifier of said second computing device.

11. The computing device of claim 9, further comprising an input device and wherein to determine that said at least one configuration file has expired, said processor is further enabled to receive an indication from said input device that synchronization between said computing device and said second computing device is no longer required.

12. The computing device of claim 9, wherein said at least one configuration file is stored in said memory in association with an identifier of said second computing device, and to determine a location of said at least one configuration file said processor is further enabled to determine said identifier and find said location in said memory using said identifier.

13. The computing device of claim 12, wherein said determining said identifier comprises looking up said identifier in a list of computing devices which have previously been synchronized with said computing device.

14. The computing device of claim 9, wherein said data for synchronizing said second computing device with said computing device comprises data indicative of at least one file to be downloaded from said computing device to said second computing device when said second computing device is in communication with said computing device.

15. The computing device of claim 9, wherein said at least one file comprises a media file.

16. The computing device of claim 9, wherein said at least one configuration file is stored in association with a multimedia application at said computing device.

* * * * *